R. S. FULTON.
SHOCK ABSORBER.
APPLICATION FILED APR. 12, 1921.
1,428,225.
Patented Sept. 5, 1922.
2 SHEETS—SHEET 2.
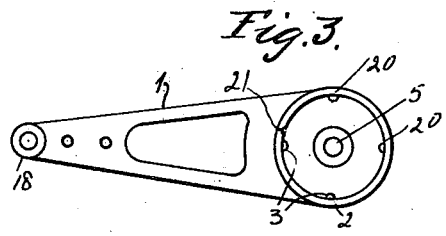
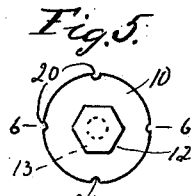
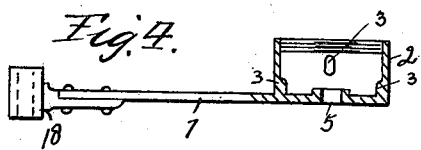
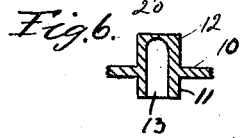
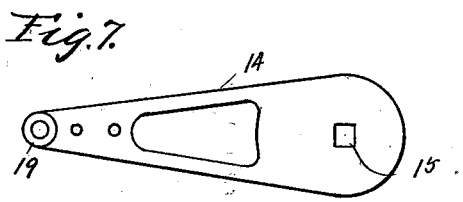
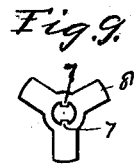
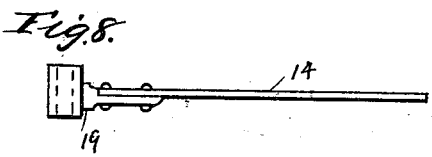
Inventor
Robert S. Fulton
By
W. W. Williamson
Atty.

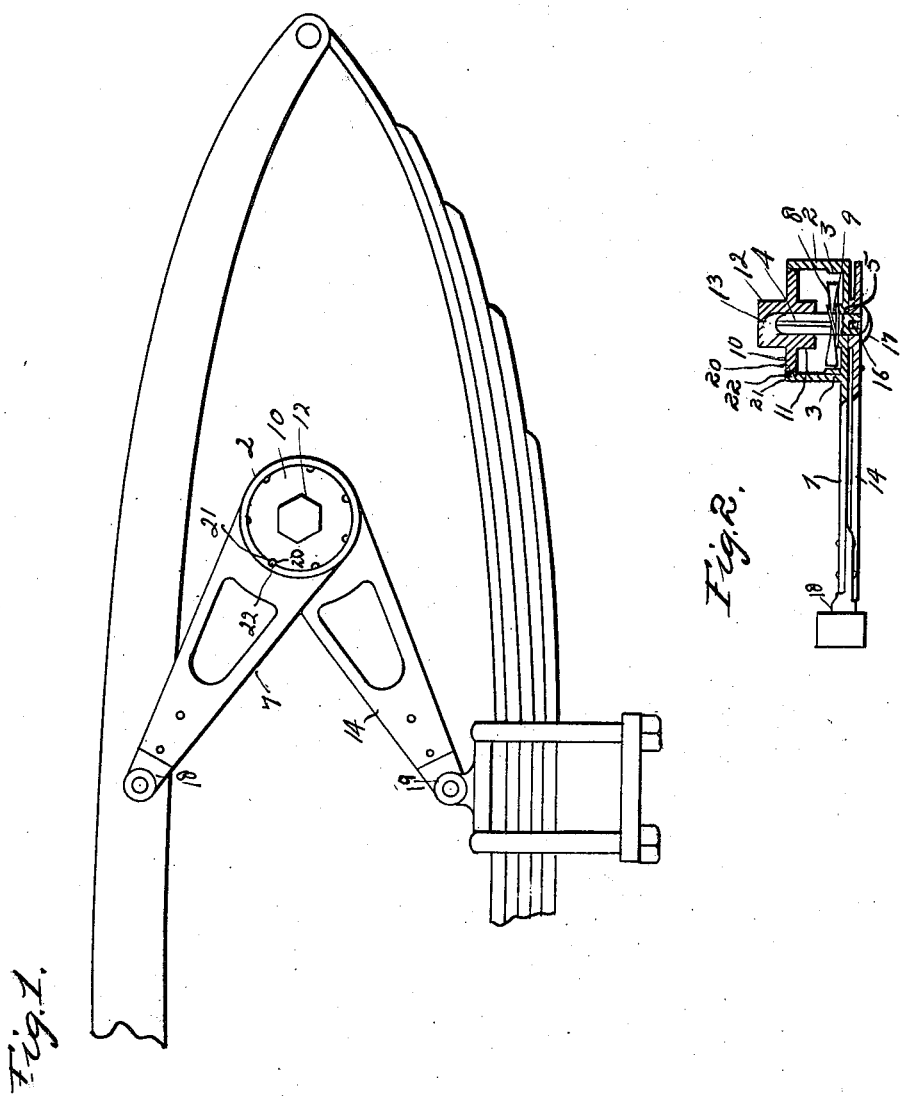

Patented Sept. 5, 1922.

1,428,225

UNITED STATES PATENT OFFICE.

ROBERT S. FULTON, OF PHILADELPHIA, PENNSYLVANIA.

SHOCK ABSORBER.

Application filed April 12, 1921. Serial No. 460,694.

*To all whom it may concern:*

Be it known that I, ROBERT S. FULTON, a citizen of the United States, residing at Philadelphia, in the county of Philadelphia and State of Pennsylvania, have invented new and useful Improvements in Shock Absorbers, of which the following is a specification.

My invention relates to a new and useful improvement in shock absorbers, and has for its object to provide an exceedingly simple and effective device of this description which may be readily applied to the springs of an automobile or other vehicle to retard the undue jump and jerk of said springs absorbing the shock which would otherwise be transmitted to the body of the vehicle and occupants thereof.

A further object of the invention is to so construct a shock absorber that the retarding action may be varied so as to adapt the device for machines of different weights.

A still further object of the invention is to utilize graphite in finely divided form as a medium for exerting the retarding action upon the rotor; and A still further object of the invention is to provide means for compressing the graphite to different degrees of density.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1, is an elevation of a portion of an automobile chassis showing one of the springs coupled therewith and my improved shock absorber in position relative to these parts.

Fig. 2, is a plan view of the shock absorber, the casing for containing the graphite being in section.

Fig. 3, is a detail elevation of the casing lever and casing carried thereon.

Fig. 4, is a plan view of Fig. 3, the casing being in section.

Fig. 5, is a face view of the adjustable cap for threading into the casing.

Fig. 6, is a section of Fig. 5 taken at the line 6—6.

Fig. 7, is a detail elevation of the rotor lever.

Fig. 8, is a plan view of Fig. 7.

Fig. 9, is an elevation of the rotor.

Fig. 10, is an edge view of Fig. 9.

Fig. 11, is a detail view of the rotor spindle.

In carrying out my invention as here embodied, 1 represents a casing lever having formed therewith or secured thereto the cylindrical casing 2 upon the interior walls of which latter are located the staggered lugs 3.

4 represents a spindle which is journalled in the central opening 5 and this spindle has the keyways 6 formed therein for the reception of the keys 7 of the rotor 8 which latter is adapted to fit over the spindle and be thus keyed thereto so as to rotate therewith. This rotor consists of a plurality of plates set at an angle after the manner of a propeller blade as clearly shown in Fig. 10. On the spindle 4 is fixed a collar or washer 9 which abuts against the inner face of the casing and thus positions said spindle within the casing.

10 represents a cap its periphery being threaded so as to screw into the casing 2 which is internally threaded for the reception of this cap and with this cap is formed a hub 11 which projects into the casing when the cup is in place, while upon the outer face of the cap is formed a wrench hold 12 in alignment with the hub and in this hub and wrench hold is formed a bearing 13 for the reception of the inner end of the spindle 4; said bearing being of such length as to allow for the adjustment of the cap.

14 represents the rotor lever having a squared hole 15 formed in the center of the hub thereof which is adapted to fit over the squared end 16 of the spindle 4, thus causing the spindle to turn with said lever, said lever being held in place upon the spindle by the overlapping head of the screw 17 as will be readily understood.

The lever 1 is provided with a connecting member 18, the lever 14 also being provided with a similar connecting member 19 whereby the outer ends of these levers may be pivotally attached to the chassis and axle clip or any other suitable portion of the machine which will interpose the action of the shock absorber between the spring and chassis.

In assembling the device dry ground graphite is placed within the casing and the cap is screwed home until the desired pressure is placed upon this graphite after which any movements of the rotor will force a displacement or movement of the graphite within the casing which will require considerable force to effect, the amount of force necessary for this displacement or movement being determined by the amount of pressure under which this graphite is confined so that when the device is in position upon an automobile as before described the sudden jerk, back lash or snap of the spring will be retarded and modified, thus absorbing the shock which would otherwise be transmitted to the body of the machine.

It will be seen that the staggered lugs 3 will prevent the ready movement of the graphite around the interior walls of the casing, thus increasing the retarding action of the graphite upon the blades of the rotor.

In order that the cap may be held in any adjustment I have here provided a series of notches 20 in the periphery of the cap and a corresponding notch 21 in one part of the wall of the casing, these notches being threaded so that a small screw 22 may be inserted in the notch in the wall of the casing when one of the notches in the cap coincides therewith. This will serve as a positive lock against retrograde movement of the cap when once adjusted and yet permit the readjustment of the cap by the removal of the screw. By this arrangement the retarding tension on the rotor may be increased or decreased as occasion requires, thus adapting my improved shock absorber upon machines of different size and weight.

An important feature of my invention is that by using graphite no liquid or lubricant is required since the graphite in itself is a lubricant and permits the parts to properly function relative to each other.

Of course I do not wish to be limited to the exact details of construction as herein shown as these may be varied within the limits of the appended claims without departing from the spirit of my invention.

Having thus fully described my invention, what I claim as new and useful is:—

1. A shock absorber comprising a casing adapted to contain graphite under pressure, means for varying the pressure upon said graphite, a lever carried by the casing, a spindle projecting through the casing, a rotor so mounted upon said spindle as to revolve therewith, a second lever secured to the spindle, and means for attaching the outer ends of the levers to certain parts of a vehicle.

2. In a shock absorber of the character described, a casing adapted to contain graphite, a cap so threaded into said casing as to confine said graphite under pressure, lugs formed upon the interior walls of the casing for retarding the movement of the graphite, a spindle projecting through the casing and into the cap, a rotor secured to the spindle, said rotor having blades set at an angle for bringing about a movement of the graphite when the spindle is rotated, and means for rotating said spindle.

3. A shock absorber, the combination of a casing, graphite contained in said casing under pressure, means for varying the pressure upon said graphite, a spindle projecting through the casing, a rotor comprising angular blades, said rotor being secured to the spindle, and means for connecting the casing and spindle to certain parts of a vehicle.

4. In a shock absorber, the combination of a lever, a casing carried by said lever, said casing being adapted to contain graphite, lugs formed upon the inner walls of the casing for retarding the movement of the graphite, a cap threaded into said casing, means for locking said cap in various adjustments, a hub formed with the cap, a wrench hold also formed with the cap, a long bearing formed in the hub and wrench hold, a spindle projecting through the casing and into said bearing, a rotor rigidly secured to the spindle, said rotor having angular set blades, and a second lever secured upon the outer end of the spindle.

5. In a device of the character described, the combination of a casing, lugs formed upon the inner walls of said casing, a body of graphite contained within the casing, a cap threaded within the casing, means for holding said cap in various adjustments, a bearing formed in the cap, a spindle projecting through the casing and into said bearing, a collar carried by the spindle, a rotor rigidly mounted upon said spindle, a lever secured to the outer end of the spindle, a lever also carried by the casing, and means for pivoting the outer ends of the levers to certain parts of an automobile whereby the movements of the spring of said vehicle will revolve the rotor to absorb the shock.

In testimony whereof, I have hereunto affixed my signature.

ROBERT S. FULTON.